(12) United States Patent
Tokairin et al.

(10) Patent No.: US 6,177,949 B1
(45) Date of Patent: Jan. 23, 2001

(54) OPTICAL WRITE HEAD AND EXPOSURE APPARATUS CAPABLE OF WRITING DATA IN HIGH SPEED WITHOUT FLUCTUATION IN LIGHT EMITTING TIMING

(75) Inventors: Motohiro Tokairin; Tamotsu Nishiura, both of Kawasaki; Hideo Tanaka, Hitachi, all of (JP)

(73) Assignees: Fujitsu Limited, Kanagawa (JP); Hitachi Cable Ltd., Tokyo (JP)

( * ) Notice: Under 35 U.S.C. 154(b), the term of this patent shall be extended for 0 days.

(21) Appl. No.: 09/206,149

(22) Filed: Dec. 7, 1998

(30) Foreign Application Priority Data

Jul. 1, 1998 (JP) .................................................. 10-186642

(51) Int. Cl.[7] ........................................................ B41J 2/435
(52) U.S. Cl. ............................. 347/237; 347/130; 347/247
(58) Field of Search .................................. 347/237, 247, 347/130, 132, 145; 257/88, 99

(56) References Cited

U.S. PATENT DOCUMENTS

| 4,835,549 | * | 5/1989 | Samejima et al. | 347/237 |
| 5,138,337 | * | 8/1992 | Ng | 347/237 |

FOREIGN PATENT DOCUMENTS

| 58-48562 | 3/1983 | (JP) . |
| 60-35874 | 2/1985 | (JP) . |
| 61-125274 | 6/1986 | (JP) . |
| 61-235168 | 10/1986 | (JP) . |
| 63-312175 | 12/1988 | (JP) . |
| 1-295865 | 11/1989 | (JP) . |
| 5-50653 | 3/1993 | (JP) . |

\* cited by examiner

*Primary Examiner*—N. Le
*Assistant Examiner*—Lamson D. Nguyen
(74) *Attorney, Agent, or Firm*—Armstrong, Westerman Hattori, McLeland & Naughton

(57) ABSTRACT

An optical write head operable in high speeds is provided with better printing results. The optical write head is arranged by an LED array constructed of a plurality of LEDs arrayed in a line form, one shift register used to store thereinto pixel data for a front half portion of this LED array, and the other shift register used to store thereinto pixel data for a rear half portion of this LED array. The optical write head is further arranged by registers for latching parallel pixel data outputted from these shift registers, and a driving circuit for simultaneously driving the LEDs employed in the LED array in response to patterns of the pixel data outputted from the registers when a control signal is inputted.

8 Claims, 7 Drawing Sheets

OPTICAL WRITE HEAD AND EXPOSURE APPARATUS CAPABLE OF WRITING DATA IN HIGH SPEED WITHOUT FLUCTUATION IN LIGHT EMITTING TIMING

BACKGROUND OF THE INVENTION

1. Field of the Invention

The present invention generally relates to an exposure apparatus used in a printer, a facsimile, a copying machine, and the like, and also to an optical write head employed in such an exposure apparatus. More specifically, the present invention is directed to such optical write head/exposure apparatus capable of writing data in a high speed without fluctuations in light emitting timing.

2. Description of the Related Art

Conventionally, in image forming apparatuses such as printers, latent images are formed on the surfaces of photosensitive members, the latent images are developed by using developing agent, and images developed by the developing agents are transferred to paper, and thereafter the transferred images are fixed on the paper by using fixing devices.

To form the latent images on the surfaces of the photosensitive members in such images forming apparatuses, exposure apparatuses are provided. These exposure apparatuses utilize LED (Light Emitting Diode) arrays and laser beams. In an exposure apparatus with employment of such an LED array, a plurality of LED elements, the total number of which is defined so as to achieve necessary resolution, are arranged in a predetermined range, so that an LED array (namely, optical write head) is formed.

FIG. 7 schematically indicates an arrangement of one conventional optical write head. As shown in this drawing, this conventional optical write head is constituted by a shift register 11, a register 12, and a large number of LEDs 13. To the shift register 11, 16-bit parallel data DATA00 to DATA15, a shift clock CLK, and a start signal DSTAR are inputted. Both an output from this shift register 11 and a latch signal LST are entered into the register 12. A large number of LEDs 13 are arranged in one line, by which a 1-line exposuring operation can be performed. Furthermore, the conventional optical write head is arranged by a switching element 14 and an AND gate circuit 15. The switching element 14 turns ON/OFF the LEDs 13. The AND gate circuit 15 AND-gates the output from the register 12 with a drive signal DSTB, and supplies the AND-gated signal as a control signal to the switching element 14.

When the 1-line exposing operation is carried out, the start signal DSTR is first inputted to this optical write head. Then, the image data for 1 line are entered to the optical write head as the parallel data DATA00 to DATA15 in unit of 16 bits in synchronism with the shift clock CLK. Thereafter, when the supply of the image data for 1 line is accomplished, the latch signal LST is entered, and also the drive signal DSTB is entered.

When the start signal DSTR is entered to the shift register 11, this shift register 11 starts to acquire the parallel data DATA00 to DATA15. Every time the shift clock CLK is inputted thereto, this shift register 11 shifts the parallel data stored therein, and also acquires new parallel data DATA00 to DATA15. When the latch signal LST is inputted into the register 12, this register 12 latches the data for 1 line which are outputted from the shift register 11, and then outputs the latched data. Upon receipt of the drive signal DSTB, the AND gate circuit 15 into which the data outputted from the shift register 11 is inputted supplies such a signal having the same level as that of the signal derived from the shift register 11 to the switching element 14. As a result, only LEDs 13 emit the light, and these LEDs 13 correspond to the bits of the shift register 11 from which high level signals are outputted. Then, while this condition is maintained for a preselected time period, the 1-line exposing operation responding to the inputted image data is carried out. Thereafter, the image data as to the next 1 line are supplied in a similar process operation in order to execute the next 1-line exposing operation.

As apparent from the foregoing descriptions, when an optical write head is manufactured in such a manner that a total number of LEDs which constitute 1 line is increased and the circuit arrangement shown in FIG. 7 is employed, such a time duration directly proportional to this total number of LEDs is necessarily required so as to set image data for 1 line.

Accordingly, other types of optical write heads have been proposed. That is, in order to shorten the time duration required to set the image data for 1 line, the optical write head constructed of shift registers, LEDs and the like is subdivided into a plurality of groups. The image data can be transferred in a parallel manner to the shift registers belonging to each of the subdivided groups. For instance, Japanese Unexamined Patent Application No. 58-48562 opened in 1983 discloses such an optical write head that the LEDs are subdivided into a plurality of LED groups, and the control circuits used to drive LEDs belonging to a subdivided LED group are employed with respect to each of these LED groups. However, in this type of optical write head having the above-described subdivided LED groups/control circuits, although the image data can be set in high speed, the light emitting timing is fluctuated. As a result, there is a problem that the print effects could not be obtained under better conditions.

SUMMARY OF THE INVENTION

The present invention has been made to solve the above-described problem, and therefore, has an object to provide an optical write head which can constitute an exposure apparatus which is operable in high speed and capable of achieving print effects under better conditions.

Another object of the present invention is to provide an exposure apparatus equipped with the above-described inventive optical write head, which can be operated in high speeds and further can provide better print effects under such conditions.

To achieve the above-described objects, an optical write head, according to an aspect of the present invention, is featured by arranging such an optical write head by using: a light emitting element array constituted by a plurality of light emitting elements arranged in a line form; a plurality of pixel data holding/outputting means capable of holding/outputting a predetermined number of pixel data, for shifting such pixel data held therein when pixel data is supplied, and also for acquiring the supplied pixel data; and light emitting element array driving means for simultaneously driving the plurality of light emitting elements employed in the light emitting element array in accordance with the pixel data outputted from the plurality of pixel data holding/outputting means when predetermined control signals are inputted.

In the optical write head with employment of the above-described structure, the driving operations for the light emitting elements can be prepared within such a time period required to cause one pixel data holding/outputting means to hold a preselected number of pixels. Also, all of the light emitting elements can be simultaneously driven by the light emitting element array driving means. When the optical write head according to the present invention is combined with, for instance, such a distributing means to form an exposure apparatus, this exposure apparatus can be operated in high speeds, while achieving printing results under better conditions. This distributing means stores pixel data contained in time-sequential image data entered thereinto, and also distributes the stored pixel data to M pieces of pixel data holding/outputting means with respect to N pieces of these pixel data every time (N×M) pieces of pixel data are stored thereinto.

To realize the optical write head according to the present invention, as each of the pixel data holding/outputting means, a means for acquiring the image data when a shift clock is entered is employed. Furthermore, the shift clocks may be preferably, separately entered into a plurality of pixel data holding means.

With employment of such a structure, the circuit for supplying the image data to the optical write head can be more readily formed which may constitute the exposure apparatus.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Referring now to drawings, various preferred embodiments of the present invention will be described below in detail.

Figure 1:
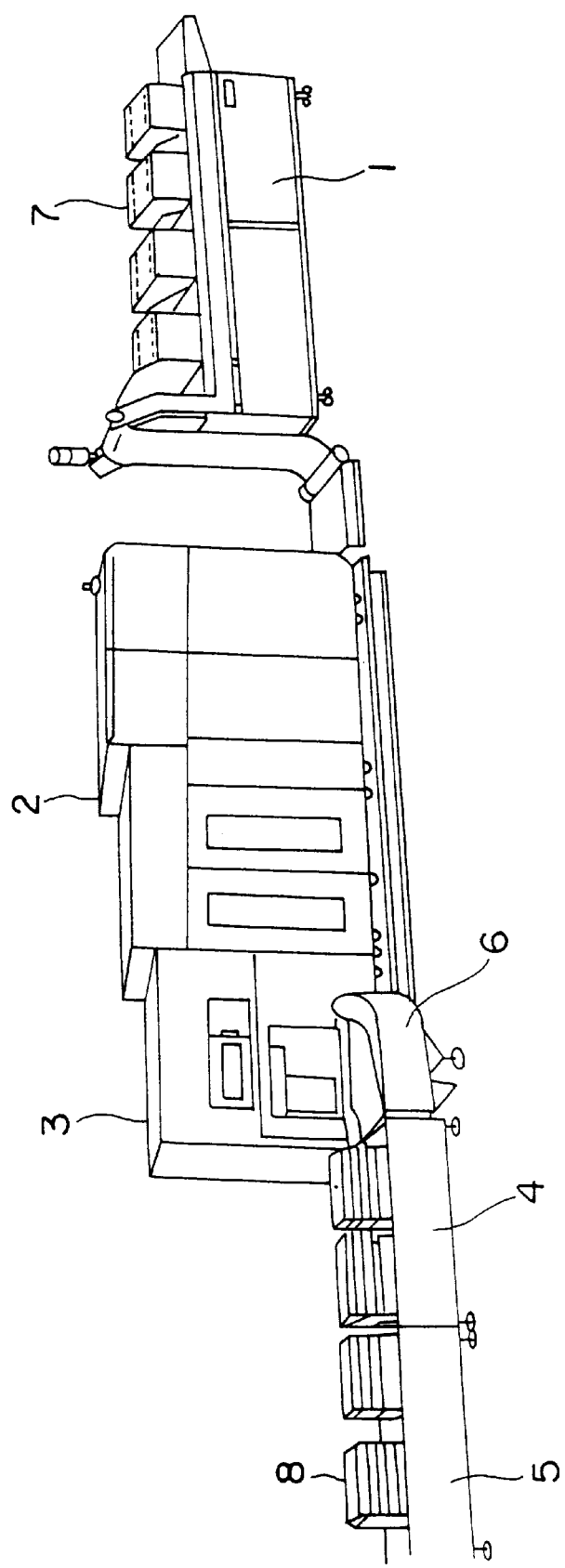
FIG. 1 schematically shows an outer view of a printing apparatus manufactured by employing an optical write head according to the present invention.
Figure 2:
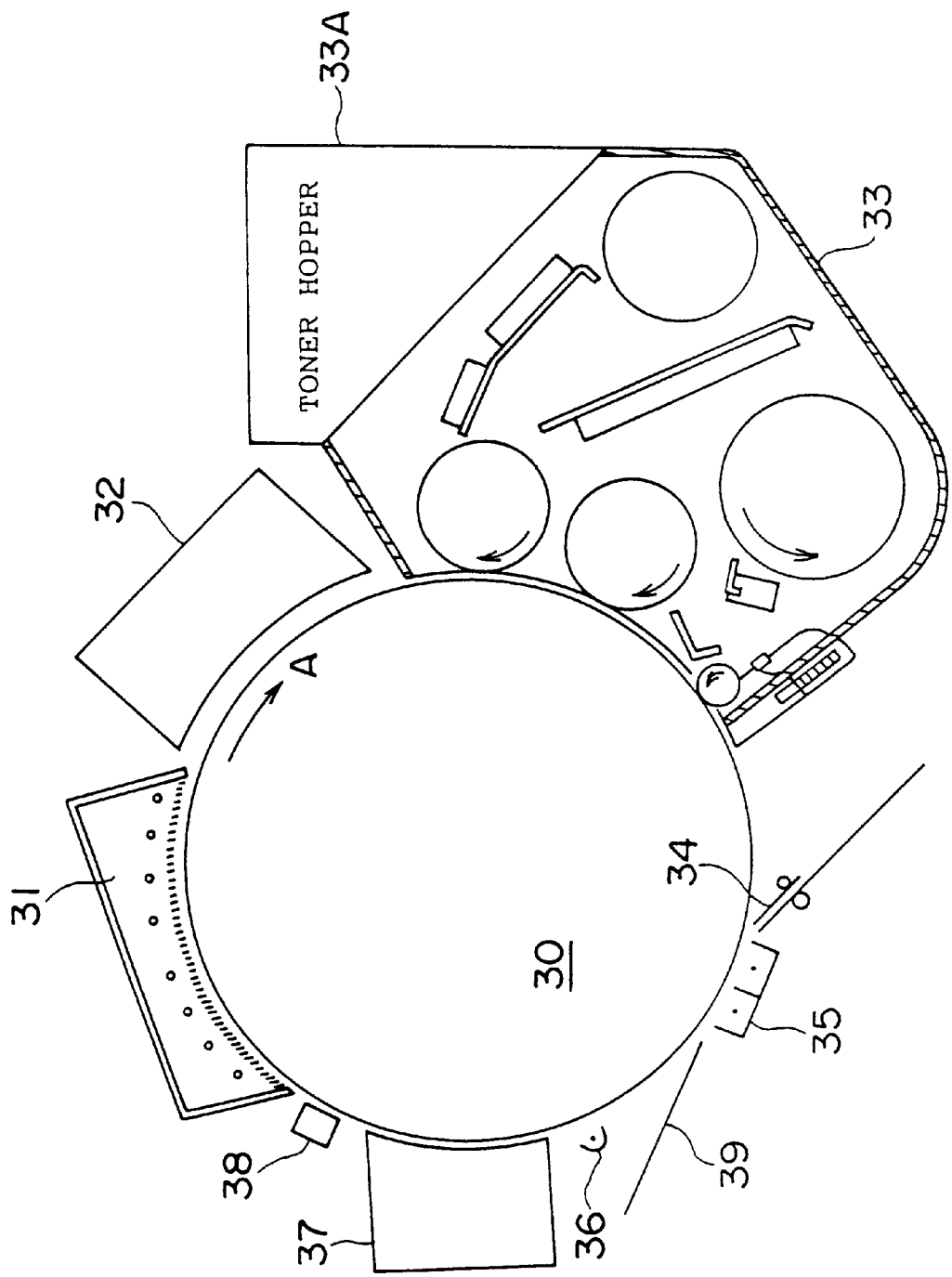
FIG. 2 is a cross-sectional view for schematically representing a process unit manufactured by using the optical write head of the present invention.

Before describing arrangements and operations of optical write head according to the present invention, a description will now be briefly made of an arrangement and operations of a printing apparatus with employment of the optical write head according to the present invention with reference to FIG. 1 and FIG. 2. It should be noted that FIG. 1 is a perspective view for schematically showing an outer appearance of the printing apparatus manufactured by using the optical write head of the present invention, and FIG. 2 is a cross-sectional view for indicating a process unit provided in a printing unit for constituting the printing apparatus of FIG. 1.

As indicated in FIG. 1, the printing apparatus is arranged by a mounting base 1, a printing unit 2, and a paper processing unit 3. The mounting base 1 mounts thereon printing paper 7 to be printed. The printing unit 2 actually prints on the printing paper 7 supplied from this mounting base 1. The paper processing unit 3 processes printed paper 8 which is printed in unit of a job (namely, printing process unit) by this printing unit 2. Also, the printing apparatus may be used by combining with a direction changing unit 6, and conveyers 4, 5.

The printing paper 7 to be printed, which is an unprinted consecutive sheet paper folded at perforation positions, is mounted on the mounting base 1 in unit of a commercially available printing paper box (approximately 1,500 sheets per printing paper box). In a principle operation, this printing apparatus is operated, while setting the printing paper 7 in unit of one printing paper box as one process unit. Alternatively, this printing apparatus may be arranged as follows. That is, plural boxes of the printing paper 7 are mounted on the mounting base 1, rear ends of the printing paper 7 in unit of one printing paper box are connected to front ends of the printing paper 7 in unit of the next printing paper box by using a proper connecting means such as a cellophane tape. As a result, this printing apparatus may print out with respect to the plural boxes of printing paper 7.

The printing unit 2 is connected via a network to a host computer. The printing unit 2 prints out print data supplied from the host computer on the printing paper 7 supplied from the mounting base 1 in response to a print instruction issued from this host computer. Then, the printing unit 2 feeds the print results as the printed paper 8 to the paper processing unit 3.

The paper processing unit 3 sequentially stacks the printed paper 8 supplied from the printing unit 2 on a table provided within this paper processing unit 3. Then, when a total amount of the printed paper 8 stacked on the table reaches a predetermined amount (for example, the above-described unit of printing paper box), the paper processing unit 3 conveys this stacked printed paper 8 from a side surface to a direction changing unit 6.

The direction changing unit 6 changes the convey direction of a predetermined amount of the printed paper 8 conveyed from the side surface of the paper processing unit 3 into an arranging direction (namely, flow direction of conveyers 4 and 5) along which the mounting base 1, the printing unit 2, and the paper processing unit 3 are arranged, and thereafter feeds the printed paper 8 onto the conveyer 4. The conveyers 4 and 5 are such mechanisms capable of mounting thereon a plurality of printed paper 8, and capable of conveying the printed paper 8 along the above-described arranging direction. The conveyer 4 receives the printed paper 8 supplied from the direction changing unit 6, and feeds out the printed paper 8 onto the conveyer 5 under such a condition that the conveyer 4 is filled with the printed paper 8. The printed paper 8 printed out in this printing apparatus is stored on these conveyers 4 and 5 to be prepared for acceptance by a print request user.

It should also be noted that the conveyers 4, 5, and the direction changing unit 6 may be connected to the printing apparatus in such a form, depending upon the print at amounts and the setting conditions (layout, space of setting place etc.) of the printing apparatus (for instance, conveyer 4 is directly coupled to paper processing unit 3 without using the direction changing unit 6, or only the conveyer 4 is connected to direction changing unit 6).

A process unit containing a structure shown in FIG. 2 is provided in the printing unit 2. As indicated in FIG. 2, the process unit is constituted by a photosensitive drum 30, a precharging unit 31, an exposing unit 32, a developing apparatus 33, a paper conduct guide 34, a transferring unit (transferring/charging device) 35, an AC electric-eliminator 36, a cleaning unit 37, and an LED electric-eliminator 38. The respective units 31 through 38 are arranged around the photosensitive drum 30.

During printing operation, the photosensitive drum 30 provided within this process unit is rotated along a direction indicated by an arrow "A" shown in FIG. 2 and drived, and a surface of the photosensitive drum 30 is uniformly charged by the precharging device 31. Subsequently, a pattern corresponding to print data is exposed on the surface of the photosensitive drum 30 by the exposing unit 32 which uses an optical write head according to the present invention (will be discussed later), and then an electrostatic latent image corresponding to the print data is formed on the charged surface of the photosensitive drum 30. Then, this electrostatic latent image is developed by the developing apparatus 33. In other words, the developing process operation is carried out in such a manner that toner stored in a toner hopper 33A is adhered to this electrostatic latent image, so that a toner image corresponding to a visible image is formed on the photosensitive drum 30.

In synchronism with the above-described process operation, the printing paper 7 supplied from the mounting base 1 is guided by the paper conduct guide 34 to be transported between the transferring unit 35 and the photosensitive drum 30 within the printing unit 2. Then, the toner image formed on the photosensitive drum 30 is transferred onto this printing paper 7 by the transferring unit 35. Thereafter, the printing paper 7 with the toner image is conveyed to a fixing unit (not shown in detail) along a convey path 29. In this fixing unit, toner image is fixed on this printing paper 7 by applying heat, pressure, or light. Then, the toner-image-fixed printing paper 7 is supplied as the printed paper 8 to the paper processing unit 3.

It should be understood that a portion of the toner is not transferred onto the printing paper 7, but is left on the surface of the photosensitive drum 30 after the transfer step. Both the AC electric-eliminator 36 and the clearing unit 37 constitute a mechanism for removing this remaining toner from the surface of the photosensitive drum 30. After the electron charges are eliminated by the AC electric-eliminator 36, this remaining toner is mechanically removed from the surface of the photosensitive drum 30 by the cleaning unit 37. Then, after the remaining toner has been removed, the electron charges of the photosensitive drum 30 are eliminated by the LED electric-eliminator 38, and the surface of the photosensitive drum 30 is returned to the initial condition (namely, under such a condition that potential at photosensitive drum 30 becomes 0V).

Now, a description will be made of structures/operations of two sorts of optical write heads (referred to as "first optical head" and "second optical head" hereinafter) which have been developed for the above-described process unit.

Figure 3:
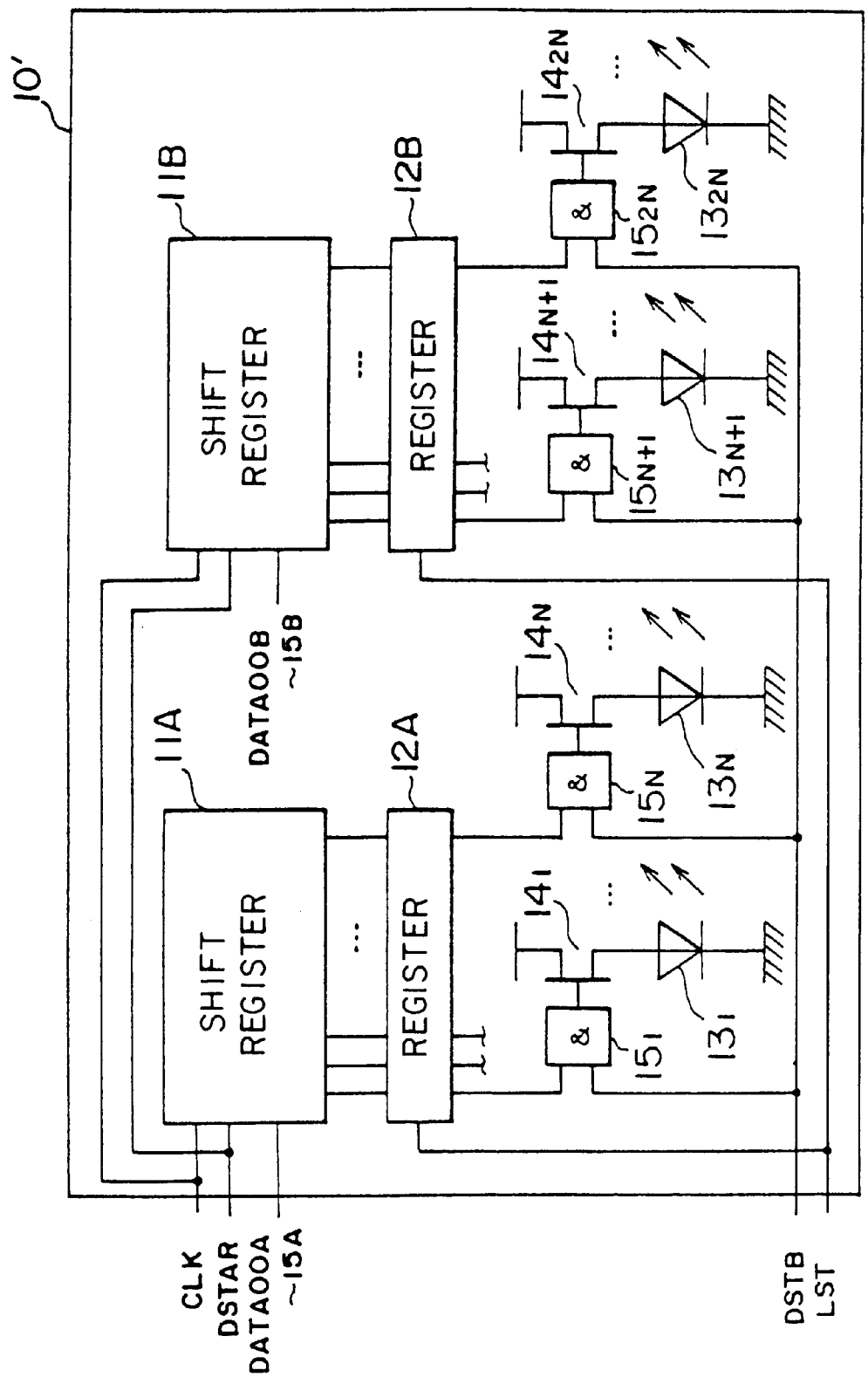
FIG. 3 is a schematic block diagram for indicating an arrangement of a first optical write head according to the present invention.

As indicated in FIG. 3, a first optical write head 10' is arranged by two shift registers 11A, 11B; two registers 12A, 12B; 2N ("N" being an integer) pieces of LEDs $13_1$ to $13_{2N}$ arrayed along 1 line, capable of performing 1-line exposing operation; switching elements $14_1$ to $14_{2N}$; and AND gate circuits $15_1$ to $15_{2N}$. The shift registers 11A and 11B are such shift registers capable of storing N-bit data therein. Similarly, both the registers 12A and 12B are such registers capable of storing N-bit data.

A CLK terminal and a DSTAR terminal of the shift register 11A are connected to a CLK terminal and a DSTAR terminal of the shift register 11B, respectively. N pieces of data output terminals of this shift register 11A are connected to N pieces of data input terminals of the register 12A, respectively. N pieces of data output terminals of the shift register 11B are connected to N pieces of data input terminals of the shift register 12B, respectively. An LST input terminal of the register 12A is connected to an LST input terminal of the register 12B. Data output terminals of the registers 12A and 12B are connected to one input terminal of each of the AND gate circuits $15_1$ to $15_{2N}$, respectively. The other input terminals of all of the AND gate circuits 15 are connected to a supply source for the drive signal DSTB. The output terminals of the AND gate circuits $15i$ (i=1 to 2N) are connected to the control terminals of the switching elements $14i$ (i=1 to 2N).

Figure 4:
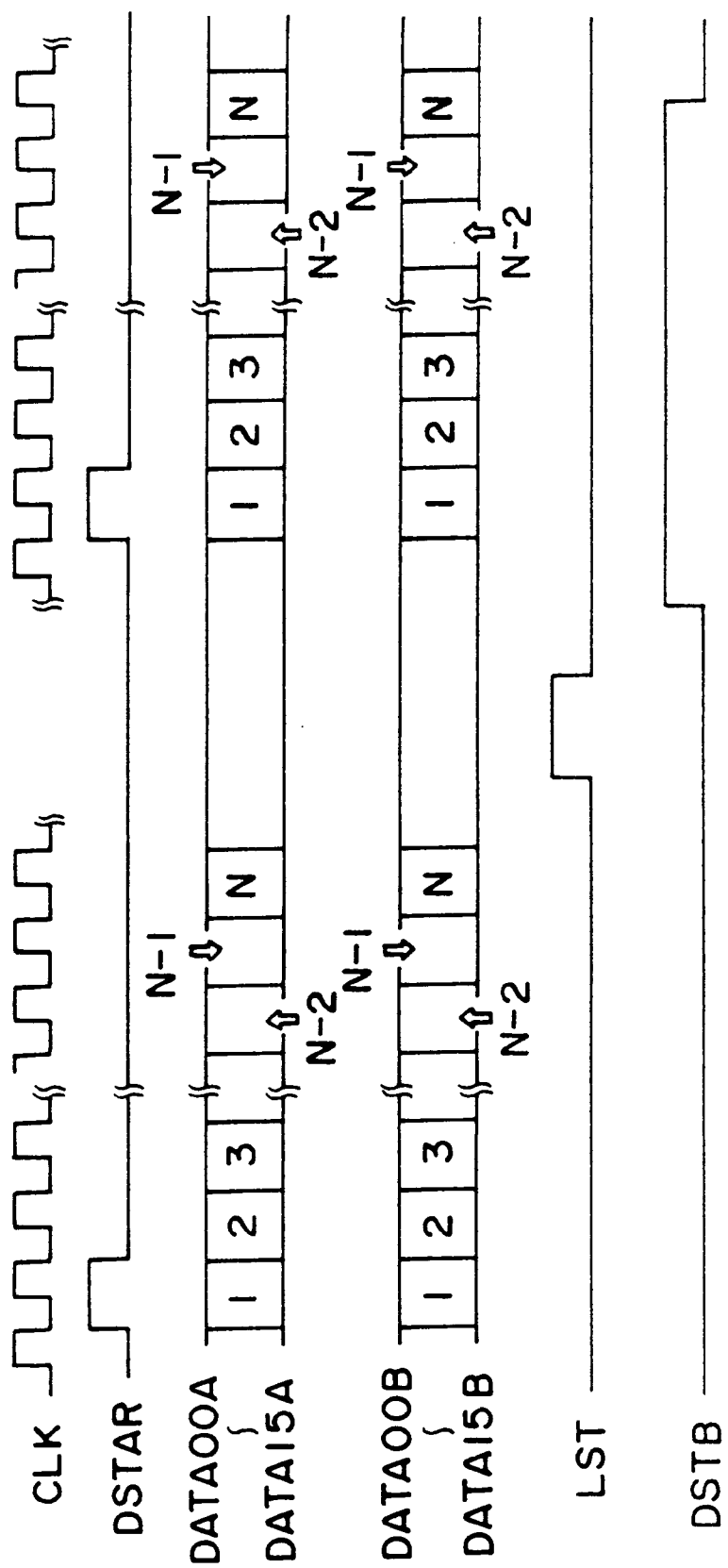
FIG. 4 is a timing chart for explaining operations of the first optical write head.

As indicated in a timing chart of FIG. 4, in this first optical write head 10', when a start signal DSTAR is supplied, at the same time, both the shift register 11A and the shift register 11B commence a process operation for acquiring different data (namely, DATA00A to DATA15A, and DATA00B to DATA15B) in synchronism with a shift clock CLK. Since both the shift registers 11A and 11B are such shift registers capable of storing the N-bit data, the data transfer operations to both the shift registers 11A and 11B are simultaneously completed.

Then, when a latch signal LST is applied, the outputs from the shift registers 11A and 11B are latched by the registers 12A and 12B, respectively. Thereafter, when a drive signal DSTB is applied, the corresponding switching elements 14 are simultaneously turned ON by several AND gate circuits 15 connected to the data output terminals of the registers 12A and 12B, from which high-level data are outputted, among the AND gate circuits $15_1$ to $15_{2N}$. As a result, only the LEDs 13 corresponding to these data output terminals, from which the high-level data are outputted, are turned ON at the same time.

As a consequence, both the supply of the N-bit front-half raster data in the raster data for 1 line to the shift register 11B, and the supply of the N-bit rear-half raster data in this raster data to the shift register 11A are simultaneously commenced. As indicated in FIG. 4, if the first optical write head 10' is controlled in such a manner that the latch signal LST and the drive signal DSTRB are applied at the stage when the transfer operation of the N-bit data is accomplished, then this first optical write head 10' can execute the exposing operation in response to this raster data for 1 line.

As previously explained, the first optical write head 10' may constitute such an optical write head capable of setting the raster data for 1 line (namely, 2N-bit raster data) into the shift registers within such a time period during which the N-bit raster data is transferred. As a consequence, when the first optical write head 10' is combined with a circuit by which data for plural lines can be continuously supplied, it is possible to realize an exposure apparatus capable of achieving a printing result under better conditions in a high speed.

It should also be noted that the first optical write head 10' constitutes such an optical write head that the data acquisitions of the parallel data to these two shift registers 11A and 11B are carried out in response to the same shift clock. Therefore, in order to operate this first optical write head 10' in high speeds, skew defined between the parallel data entered into the shift registers 11A and 11B must be made small. However, when a circuit capable of supplying parallel data having a large bit width is formed by combining with an IC for outputting parallel data having a small bit width, it is not possible to produce a circuit capable of outputting parallel data with small skew. Also, it is practically rather difficult for a single IC to realize such a circuit capable of supplying parallel data having a large bit width, and further high cost is required to form such a circuit.

In other words, when the first optical write head 10' is actually used, the frequency of the shift clock is limited based upon the requirements (skew performance, and cost) made by the parallel data supplying circuit.

To avoid such a frequency limitation, a second optical write head 10 is developed.

Figure 5:
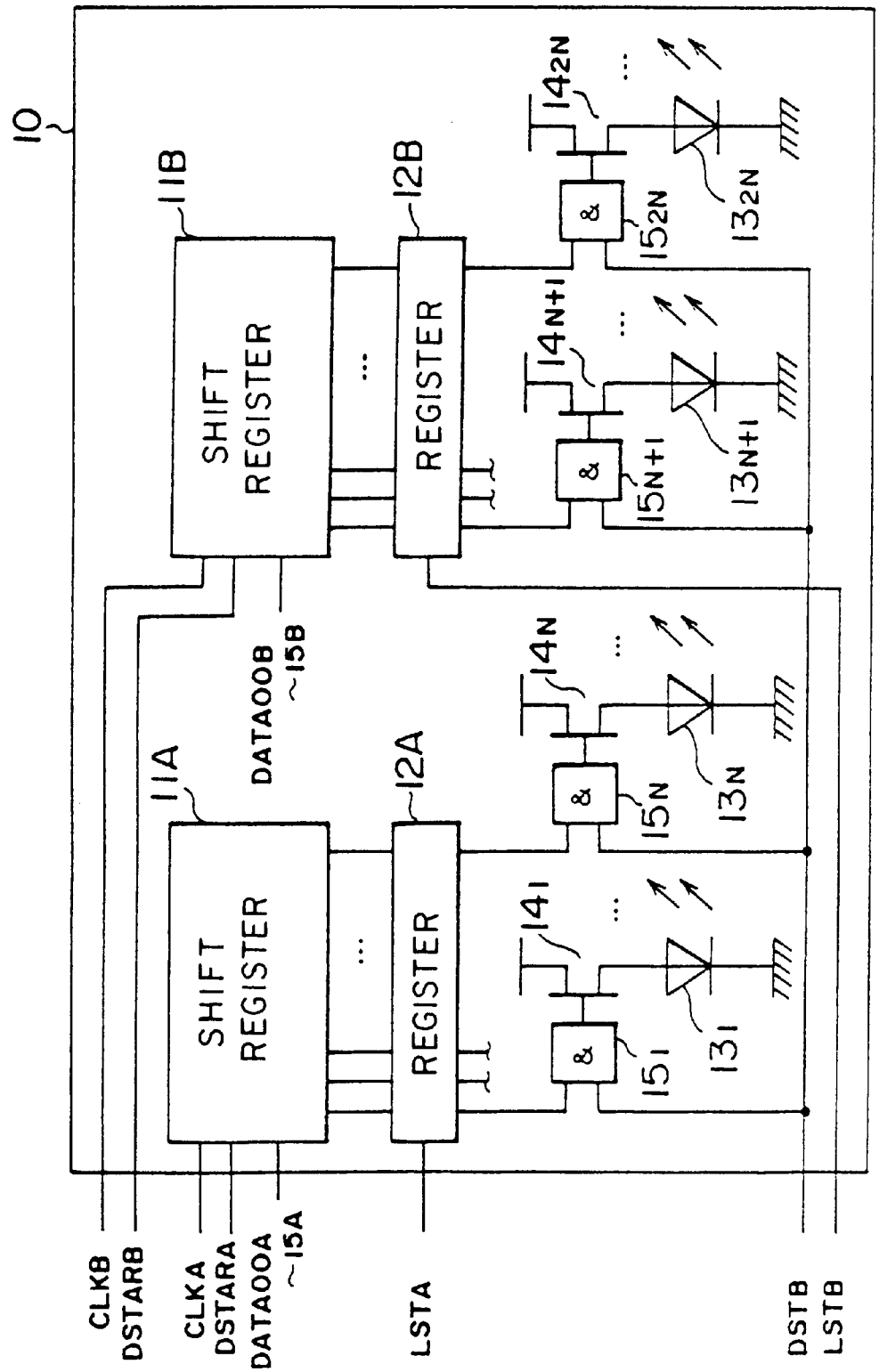
FIG. 5 is a schematic block diagram for indicating an arrangement of a second optical write head according to the present invention.

That is, as indicated in FIG. 5, a structure of the second optical write head 10 is shown. As apparent from this drawing, the second optical write head 10 is manufactured by modifying the first optical write head 10' in such a way that control signals (namely, start signals and shift clocks) can be independently supplied to the shift registers 11A, 11B, and the registers 12A, 12B.

In other words, the second optical write head 10 constitutes such an optical write head that data can be completely separately set to the respective shift registers 11, and then exposing operations can be carried out in response to these separately set data without any fluctuation in the light emitting timing by the respective LEDs.

Figure 6:
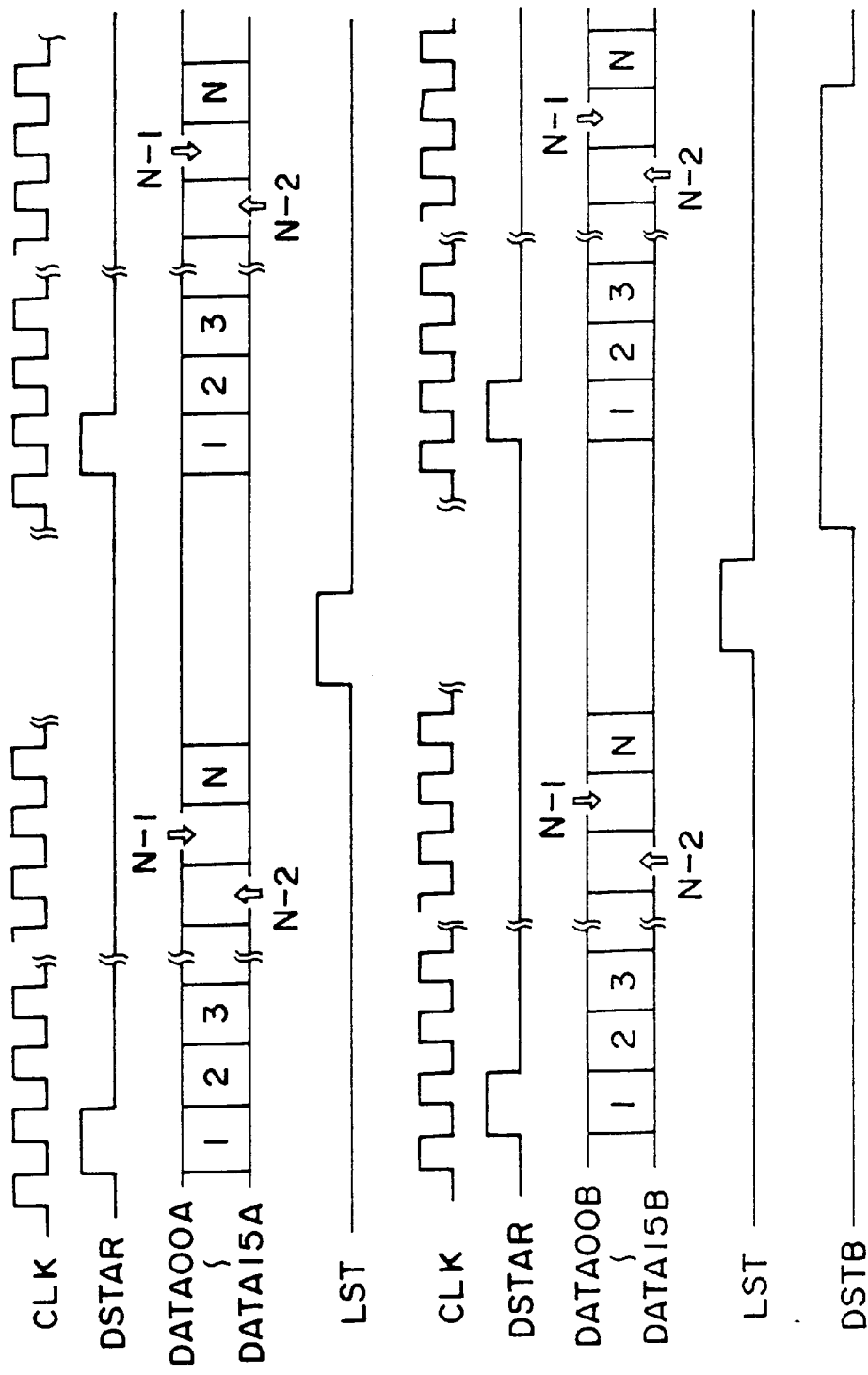
FIG. 6 is a timing chart for explaining operations of the second optical write head.
Figure 7:
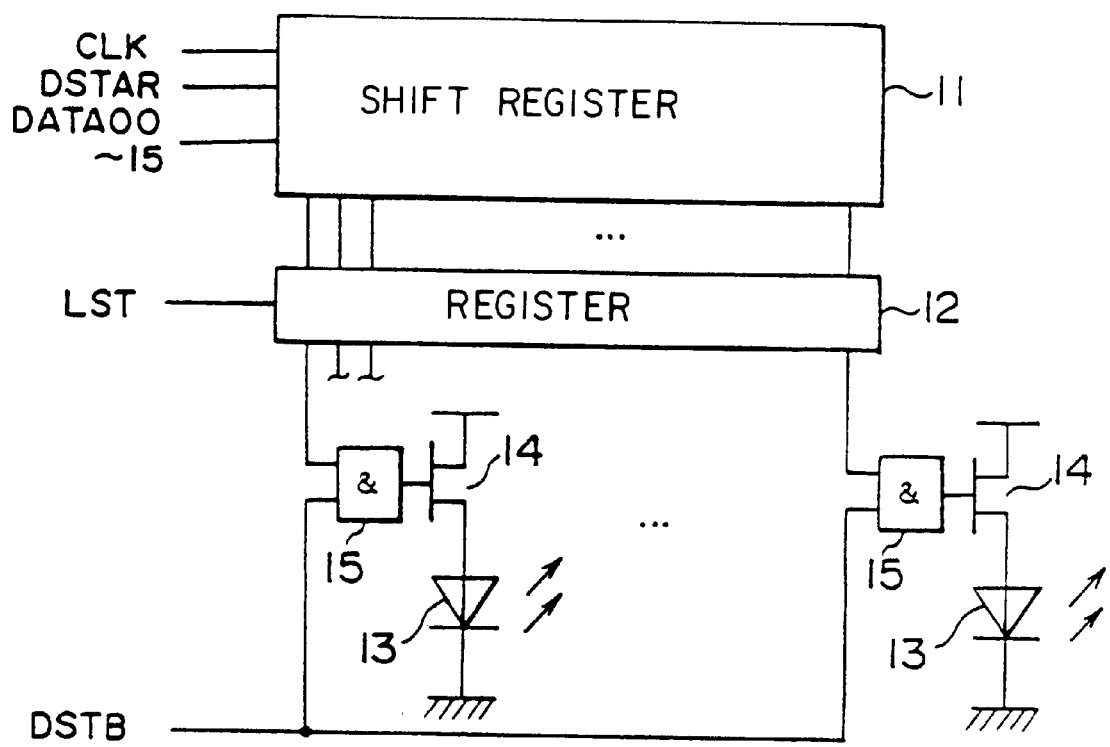
FIG. 7 represents the arrangement of the conventional optical write head.

As a consequence, as indicated in FIG. 6, the second optical write head 10 may be used under such a condition that both data DATA00A to DATA15A and data DATA00B to DATA15B are entered at different timing. In other words, this second optical write head 10 constitutes an optical write head which may be used by being connected to such a circuit capable of outputting the data DATA00A to DATA15A, and also the data DATA00B to DATA15B at different timing (namely, both the data DATA00A to DATA15A, and the data DATA00B to DATA15B are not always outputted at the same timing). As a consequence, if this second optical write head 10 is employed, then the performance limitation given to other circuits can be eased, or relaxed, as compared with the employment of the first optical write head 10'. As a result, it is possible to realize such an exposure apparatus capable of performing the exposing operation under no fluctuation condition in the light emitting timing.

The above-explained process unit is arranged by utilizing this second optical write head, and a circuit for storing therein pixel data contained in time-sequential image data entered thereinto, and for supplying the stored pixel data in unit of ½ line to the shift registers 11A and 11B every time the pixel data for 1 line is stored in this circuit.

As previously described in detail, the exposure apparatus operable in high speeds and capable of producing the printed results under better conditions can be manufactured.

What is claimed is:

1. An exposure apparatus comprising:
a light emitting element array constituted by a plurality of light emitting elements arranged in a line form;
a plurality of pixel data holding/outputting means capable of holding/outputting a predetermined number of pixel data, for shifting such pixel data held therein when pixel data is supplied, and also for acquiring said supplied pixel data; and
light emitting element array driving means for simultaneously driving said plurality of light emitting elements employed in said light emitting element array in accordance with the pixel data outputted from said plurality of pixel data holding/outputting means when predetermined control signals are inputted, wherein said control signals contain a plurality of start signals and a plurality of shift clocks which can be separately entered in said plurality of pixel data holding/outputting means.

2. An optical write head as claimed in claim 1 wherein:
said plurality of pixel data holding/outputting means are arranged by combining a plurality of shift registers with a plurality of registers.

3. An optical write head as claimed in claim 2 wherein:
in response to said control signals, the pixel data are separately set to said plurality of shift registers.

4. An optical write head as claimed in claim 1 wherein:
said light emitting element array is arranged by a plurality of light emitting diodes (LEDs).

5. An optical write head as claimed in claim 1 wherein:
said light emitting element array driving means is arranged by a plurality of AND gate circuits, and also a plurality of switching elements.

6. An exposure apparatus comprising:
a light emitting element array constituted by (N×M) pieces of light emitting elements arranged in a line form, symbols "N" and "M" being integers:
M pieces of pixel data holding/outputting means capable of holding/outputting N pieces of pixel data, for shifting such pixel data held therein when pixel data is supplied, and also for acquiring said supplied pixel data;
light emitting element array driving means for simultaneously driving said (N×M) pieces of light emitting elements employed in said light emitting element array in accordance with (N×M) pieces of said pixel data outputted from said M pieces of pixel data holding/ outputting means when predetermined control signals are inputted; and
distributing means for storing pixel data contained in time-sequential image data to be inputted, and for distributing the pixel data stored thereinto said M pieces of pixel data holding/outputting means with respect to N pieces of said stored pixel data every time (N×M) pieces of pixel data are stored, wherein:
said M pieces of pixel data holding/outputting means are arranged by combining M pieces of shift registers with M pieces of registers;
in response to said control signals, the pixel data are separately set to said M pieces of shift registers; and
said control signals contain a plurality of start signals and a plurality of shift clocks, which can be separately entered in said M pieces of shift registers.

7. An exposure apparatus comprising:
a light emitting element array constituted by (N×M) pieces of light emitting elements arranged in a line form, symbols "N" and "M" being integers;
M pieces of pixel data holding/outputting means capable of holding/outputting N pieces of pixel data, for shifting such pixel data held therein when pixel data is supplied, and also for acquiring said supplied pixel data;
light emitting element array driving means for simultaneously driving said (N×M) pieces of light emitting elements employed in said light emitting element array in accordance with (N×M) pieces of said pixel data outputted from said M pieces of pixel data holding/ outputting means when predetermined control signals are inputted; and
distributing means for storing pixel data contained in time-sequential image data to be inputted, and for distributing the pixel data stored thereinto said M pieces of pixel data holding/outputting means with respect to N pieces of said stored pixel data every time (N×M) pieces of pixel data are stored, wherein:

said light emitting element array is arranged by (N×M) pieces of light emitting diodes (LEDs).

8. An exposure apparatus comprising:

a light emitting element array constituted by (N×M) pieces of light emitting elements arranged in a line form, symbols "N" and "M" being integers;

M pieces of pixel data holding/outputting means capable of holding/outputting N pieces of pixel data, for shifting such pixel data held therein when pixel data is supplied, and also for acquiring said supplied pixel data;

light emitting element array driving means for simultaneously driving said (N×M) pieces of light emitting elements employed in said light emitting element array in accordance with (N×M) pieces of said pixel data outputted from said M pieces of pixel data holding/outputting means when predetermined control signals are inputted; and distributing means for storing pixel data contained in time-sequential image data to be inputted, and for distributing the pixel data stored thereinto said M pieces of pixel data holding/outputting means with respect to N pieces of said stored pixel data every time (N×M) pieces of pixel data are stored, wherein:

said light emitting element array driving means is arranged by a plurality of AND gate circuits, and also a plurality of switching elements.

* * * * *